United States Patent

[11] 3,611,109

| [72] | Inventor | James J. Jones<br>Plano, Tex. |
|---|---|---|
| [21] | Appl. No. | 837,433 |
| [22] | Filed | June 30, 1969 |
| [45] | Patented | Oct. 5, 1971 |
| [73] | Assignee | Texas Instruments Incorporated<br>Dallas, Tex. |

[54] FREQUENCY CONVERTOR
8 Claims, 4 Drawing Figs.

[52] U.S. Cl. .................................................. 321/65,
303/21 CF, 317/5, 321/69
[51] Int. Cl. .................................................. H02m 5/00
[50] Field of Search .................................................. 303/21 BE,
21 C, 21 CE, 21 CG; 321/4, 6, 60, 65, 69; 317/5

[56] References Cited
UNITED STATES PATENTS

| 2,980,369 | 4/1961 | Ruof | 303/21 CF |
| 3,233,946 | 2/1944 | Lockhart | 317/5 X |
| 3,237,996 | 3/1966 | Lucien | 317/5 X |
| 3,246,231 | 4/1966 | Clarke | 321/69 |
| 3,259,800 | 7/1966 | Evans | 317/5 |
| 3,274,443 | 9/1966 | Eggenberger et al. | 317/5 |
| 3,292,082 | 12/1966 | Braine et al. | 317/5 X |
| 3,340,951 | 9/1967 | Vitt | 317/5 X |
| 3,469,662 | 9/1969 | Dewar | 303/21 CG |

*Primary Examiner*—William M. Shoop, Jr.
*Attorneys*—James O. Dixon, Andrew M. Hassell, Melvin Sharp, John E. Vandigriff, Henry T. Olsen, Michael A. Sileo, Jr. and Harold Levine ABSTRACT: A vehicle skid control braking system of the type that includes a circuit for generating a signal varying in accordance with braking conditions, such as vehicle speed, wheel speed and road surface conditions. The system includes a frequency converter that has a pulse-generating circuit responsive to the variable signal for generating time-displaced pulses related thereto, and a signal-producing circuit responsive to the time-displaced pulses for producing a DC signal having a magnitude related to and varying with the frequency of the variable signal.

INVENTOR
JAMES J. JONES

FREQUENCY CONVERTOR

This invention relates to a frequency converter, and more particularly to a frequency converter in the control module of a skid control vehicle braking system.

When braking an automobile under emergency stopping conditions or under adverse road conditions, the possibility exists that the vehicle will go into an uncontrollable skid or a controllable skid which prevents the driver from bringing his vehicle to a safe stop within the distance available, In either case, one factor that indicates an imminent skid is the deceleration rate of the rear wheels. Some improvement in vehicle stability can be achieved by automatically "pumping" or pulsing the brakes at the rear wheels in an arbitrary preprogrammed way.

Recently a system has been developed which operates on the principle of inhibiting the normal braking action initiated by the automobile operator. In this system, wheel speed sensors generate signals proportional to wheel speed. The wheel speed signals are processed through a control module which generates a voltage to energize a solenoid in an actuator that controls the hydraulic braking system to the rear wheels. When a skid is imminent, a command signal from the control module causes the actuator solenoid to close a vacuum passage in a diaphragm chamber. By action of the diaphragm and the normal hydraulic pressure from the master cylinder as developed by the automobile operator, the hydraulic pressure to the rear wheels is released, thereby inhibiting the rear wheel braking action, When the rear wheels spin up, the control module produces a signal to deenergize the actuator solenoid, This restores line pressure and reapplies the rear brakes. In effect, the system "pumps" the rear brakes in a manner often recommended for controlled stopping in adverse driving conditions.

The control module includes a frequency converter for each wheel speed sensor to convert a frequency-varying signal into a direct current signal. A summation in a summing amplifier of the frequency converter outputs produces a composite of the wheel speed signals, A deceleration rate detector and an acceleration rate detector respond to the output of the summing amplifier to produce outputs proportional to the rate of deceleration and the rate of acceleration, respectively, of the rear wheels of a motor vehicle. A signal proportional to the output of the summing amplifier is transferred to a vehicle velocity ramp generator and one input of a speed inhibit switch. The velocity ramp generator produces a step ramp function having an overall slope related to the actual speed of the automobile when braking to a stop. In addition to a signal related to wheel speed, the speed inhibit switch also has an input from the vehicle velocity ramp generator and an input from a retarding force detector. An output is produced at the speed inhibit switch whenever the summation of a wheel speed signal, a velocity ramp signal, and a retarding force signal reaches a threshold condition. The retarding force detector produces an output signal which relates to the braking factors including tire condition, brake condition; and the condition of the road surface. To generate a control signal to the actuator solenoid, the output of the deceleration rate detector, the acceleration rate detector, and the speed switch must have a certain designated relationship. These three signals are the inputs to a brake controller as the last component in the control module.

An object of the present invention is to provide a frequency converter. Another object of this invention is to provide a frequency converter in a skid control vehicle braking system for converting a signal having a frequency dependent upon wheel speed into a direct current signal. A still further object of this invention is to provide a double differentiator frequency converter in a skid control vehicle braking system.

In accordance with the present invention, a wheel sensor generates a signal having a frequency proportional to wheel speed. This frequency changing signal is amplified in a first amplification stage and connected to a second amplification stage for producing a square wave output. The square wave output produced by the second amplification stage is transferred to an inverter amplifier which produces a second square wave having a 180° phase shift from the first square wave. The leading edge of the two square waves are individually differentiated and the differentiated pulses connected to an integrator. After processing by the integrator, the resulting signals are combined to produce a wave having an average value related to wheel speed.

A more complete understanding of the invention and its advantages will be apparent from the specification and claims and from the accompanying drawings illustrative of the invention.

Referring to the drawings.

Figure 1:
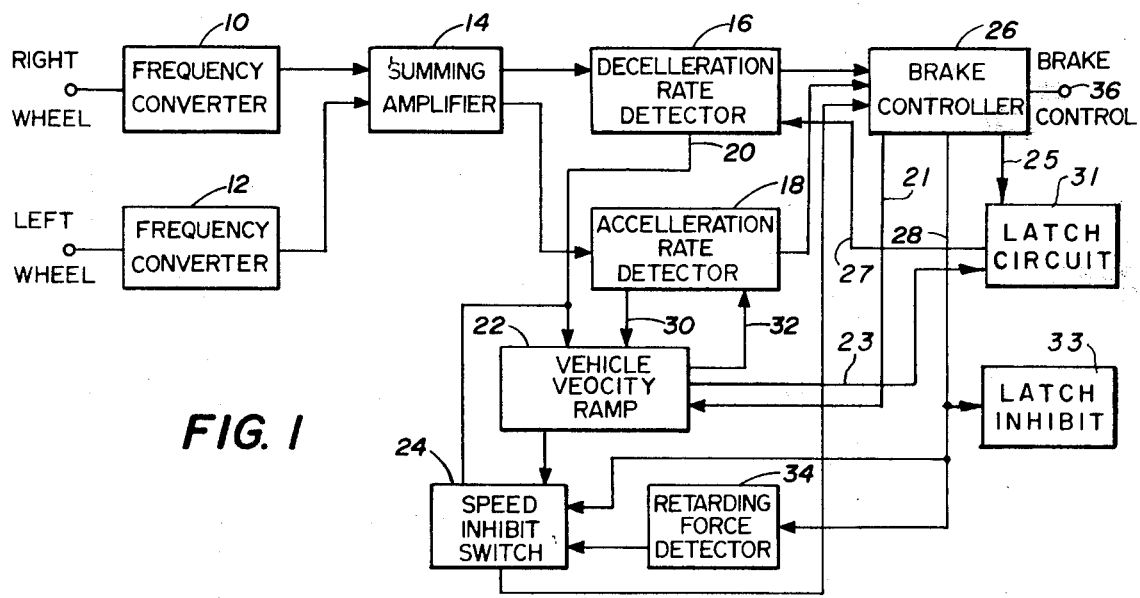
FIG. 1 is a block diagram of a control module for a skid control vehicle braking system.

Referring to the drawings, in FIG. 1 there is illustrated the components of a control module in a skid control vehicle braking system including frequency converters 10 and 12. The frequency converter 10 connects to a wheel sensor (not shown) at the right rear wheel of a motor vehicle. The wheel sensor generates a signal having frequency variations proportional to wheel speed. The faster the wheel speed, the higher the frequency of the signal connected to the frequency converter 10. Similarly, the frequency converter 12 responds to a frequency dependent signal from a wheel sensor (not shown) at the left rear wheel of a motor vehicle. The output of the converters 10 and 12 is a DC voltage having a magnitude related to the right rear wheel speed and the left rear wheel speed, respectively.

These two speed dependent voltages are connected to inputs of a summing amplifier 14 which has two output signals both proportional to the sum of the output voltages of the frequency converters 10 and 12. One of the output signals from the summing amplifier 14 connects to a deceleration rate detector 16 and the second output connects to an acceleration rate detector 18. Both the deceleration rate detector 16 and the acceleration rate detector 18 include a drive input section. The output of the driver section of the deceleration rate detector 16 appears on a line 20 and connects to inputs of a vehicle velocity ramp generator 22 and a speed inhibit switch 24. Another input to the vehicle velocity ramp generator 22 is a signal related to the output of a brake controller 26 on a line 28. A clamping circuit in the acceleration rate detector 18 also connects to the ramp generator 22.

Additional inputs to the speed inhibit switch 24, other than the voltage proportional to wheel speed on line 20, include a ramp current from the vehicle velocity ramp generator 22, the signal on the line 28 from the brake controller 26, and a retarding force current from a retarding force detector 34. An output terminal of the speed inhibit switch 24 connects to one input of the brake controller 26. An output signal from the acceleration rate detector 18 is partially controlled by the speed inhibit switch 24. A second input to the controller 26 is the output of the deceleration rate detector 16.

In operation of the control module of FIG. 1, the frequency-varying signals generated at the right rear wheel sensor and the left rear wheel sensor are converted in frequency converters 10 and 12, respectively, into DC voltages that are combined in a summing amplifier 14 to produce inputs to a deceleration rate detector 16 and an acceleration rate detector 18. The deceleration rate detector 16 generates a signal as one input to the brake controller 26 and an acceleration rate detector 18. The deceleration rate detector 16 generates a signal as one input to the brake controller 26 whenever the deceleration rate of the rear wheels exceeds a set limit. The acceleration rate detector 18 generates a signal as one input to the brake controller 26 whenever the speed inhibit switch 24 does not inhibit the normal operation of the acceleration rate detector 18. To produce a brake inhibit control signal on an output terminal 36, which is connected to a solenoid (not shown) on a brake actuator, both the detectors 16 and 18 must generate a control signal at the inputs to the brake controller 26. The speed inhibit switch 24 will release the output of the acceleration rate detector 18 whenever the three input signals thereto satisfy preset conditions, and the switch itself is not inhibited from operating.

In a typical skid control operation, the automobile operator applies pressure to the brake pedal which actuates the hydraulic brake system in the usual manner. When the deceleration rate detector 16 senses that the decrease in rear wheel speed indicates that a skid is imminent, it produces a control signal as one input to the brake controller 26. At the same time, the acceleration rate detector 18 permits the brake controller 26 to be triggered into a brake inhibit mode if the speed switch 24 has released the output of the detector 18. Whenever a control pulse from the deceleration rate detector 16 is present and the speed inhibit switch 24 releases the output of the acceleration rate detector 18, an output pulse is generated at the terminal 36 to energize a solenoid at a brake actuator, Energizing this solenoid, as explained previously, interrupts the normal hydraulic pressure applied to the rear wheels thereby inhibiting braking action.

Before the speed inhibit switch 24 will release the output of the acceleration rate detector 18, the sum of an input current related to the rear wheel speed, an input current from the vehicle velocity ramp generator 22, and an input current from the retarding force detector 34 must reach a threshold level.

During the time interval of the brake inhibit signal at the terminal 36, hydraulic pressure is released from the rear wheels which will then begin to spin up to the speed of the vehicle. This spin up of the rear wheels is sensed by the deceleration rate detector 16 and the acceleration rate detector 18 to cause the brake controller 26 to produce an output signal that deenergizes the actuator solenoid, thereby reapplying pressure to the rear wheel brake cylinders. Also provided is a latch circuit 31 which controls the "on time" of the deceleration rate detector 16 by varying its characteristics with respect to vehicle speed and the rate of acceleration of the vehicle wheels, A latch inhibit circuit 33 prevents the latch circuit 31 from controlling the deceleration rate detector until the actuator solenoid is energized. A signal generated by the brake controller 29 and coupled to the latch inhibit circuit 33 via line 21 operates the latch inhibit circuit 33, which in turn releases the latch circuit 31 and allows it to control the "on time" of the deceleration rate detector 16. Latch circuit 31 receives input signals from the vehicle velocity ramp circuit 22 via line 23 and from the brake controller 29 via line 25 and is coupled to control the deceleration rate detector 16 via line 27. On low-$\mu$ surfaces at low vehicle speeds, the latch circuit extends the brake inhibit time or "on time" of the deceleration rate detector. Applying hydraulic pressure to the rear wheel cylinders will slow the sped of the rear wheels which will again produce conditions to actuate the brake controller 26, thereby initiating a second inhibit cycle. This operation continues with the rear wheel speed decreasing and increasing until the vehicle has been brought to a controlled stop. In effect, the control module "pumps" the rear brakes in a manner often recommended for controlled vehicle stopping.

Figure 2:
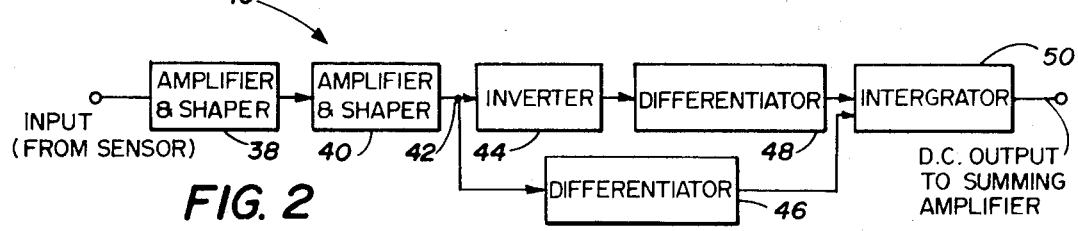
FIG. 2 is a block diagram of a frequency converter for generating a signal related to wheel speed.
Figure 3:
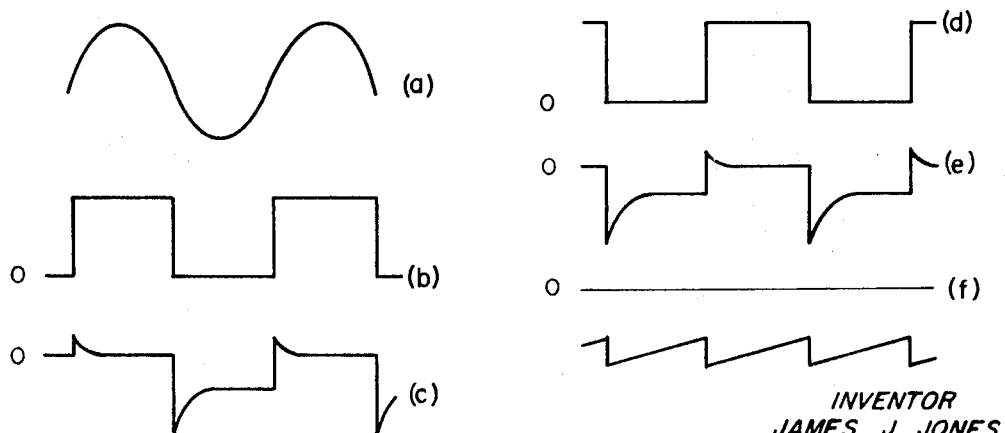
FIG. 3 illustrates the waveforms generated in the operation of a frequency converter in accordance with the present invention.

Referring to FIG. 2, there is shown a block diagram of the frequency converter 10. It will be understood that the frequency converter 12 will be of similar construction and operation. A frequency-varying signal is received from the right rear wheel sensor as an input to an amplifier and shaper circuit 38. The circuit 38 amplifies and shapes the output of the wheel sensor to a level which produces saturation in an amplifier and shaper circuit 40 connected 38 varies as illustrated in FIG. 3a, then the output from the amplifier 40, at a junction 42, will be a square wave pulse train as illustrated in FIG. 3b.

The voltage pulses at the junction 42 are connected as the input to an inverter amplifier 44 and as the input to a differentiator 46. In the inverter amplifier 44, the pulse train at the junction 42 is inverted to produce a square wave pulse train appearing at the output of the amplifier 40, as illustrated in FIG. 3d. This second pulse train connects to the input of a differentiator 48. Thus, the frequency converter 10 includes double differentiation which results in a lower ripple/delay ratio than possible with single differentiation. The outputs of the differentiators 46 and 48 are integrated and combined in an integrator 50 which has a high ripple content output as illustrated at FIG. 3f. The average value of the output waveform will be displaced from the zero level by an amount related to wheel speed. HIgher wheel speeds produce a more negative output from the integrator 50.

A double differentiator provides twice the output information with the same input information as a single differentiator but does not increase the transport lag between the input and output. Both the leading and lagging edges of the squared waveform at the junction 42 are differentiated. An aspect of the frequency converter in accordance with this invention is that with the same wheel sensor, there will be a decrease in delay between the input and output of the skid control module thereby resulting in improved braking performance.

Figure 4:
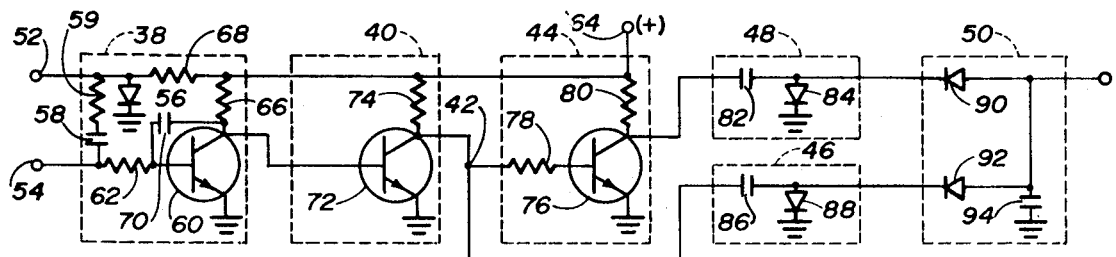
FIG. 4 is an electrical schematic of the frequency converter of FIG. 2.

Referring to FIG. 4, there is shown schematically the amplifiers 38 and 40, the inverter 44, the differentiators 46 and 48 and the integrator 50. Since either grounded or ungrounded systems may be used, the frequency-varying signal from the wheel sensor connects to input terminals 52 and 54 of the amplifier 38. A diode 56 biases the terminal 52 one diode drop above ground potential. A capacitor 58 in series with a resistor 59 filters unwanted noise components from the frequency signal generated by the wheel sensor. A voltage on the terminal 54 is applied to the base electrode of a transistor 60 through a base resistor 62. The transistor 60 is in a grounded emitter circuit with a collector electrode connected to the positive terminal of a direct current supply (not shown) at a terminal 64 through a load resistor 66. A resistor 68 and the diode 56 establish the bias level of the base drive voltage. To stabilize the operation of the amplifier 38, a feedback capacitor 70 is tied between the collector electrode and the base electrode of the transistor 60.

An output signal from the amplifier 38 at the collector electrode of the transistor 60 drives the base of a transistor 72 in the amplifier 40. Amplifier 40 is a simple grounded emitter circuit with the collector electrode of the transistor 72 connected to a direct current source through a load resistor 74. A sinusoidal wave, such as illustrated at FIG. 3a, is amplified in the amplifier 38 to drive the transistor 72 into and out of saturation. As the sinusoidal function at the terminal 54 passes through zero and increases positively, the transistor 72 is cut off and the collector electrode rises sharply to the collector drive voltage. Transistor 72 remains in a nonconducting state until the voltage wave at the terminal 52 passes through zero and increases negatively, at which time it is immediately driven into saturation. DUring the negative half cycle of the wave at terminal 54, the collector electrode of the transistor 72 is clamped at ground potential. The square wave output of the amplifier 40 is illustrated as a pulse train in FIG. 3b and appears at the junction 42.

The square wave pulse train at the junction 42 provides a base drive signal for a transistor 76 in the inverter 44 through a base resistor 78. Again, the transistor 76 is in a grounded emitter configuration with the collector electrode connected to the terminal 64 through a load resistor 80. Operationally, the inverter is similar to the amplifier 40. A positive voltage at the base electrode clamps the collector electrode of the transistor 76 to ground. When the transistor 72 clamps the junction 42 at ground potential, the transistor 76 turns off and the collector electrode rises to the collector voltage. This generates a square wave pulse train coinciding with that appearing at the junction 42, but having a 180° phase shift as illustrated in FIG. 3d.

A pulse train at the collector electrode of the transistor 76 is applied to the differentiator 48 which includes a capacitor 82 and a diode 84 connected to ground. Operationally, the differentiator 48 produces a voltage spike at the leading edge of each pulse appearing at the junction 42. These voltage spikes are illustrated at FIG. 3e. The trailing edges of the pulses at the junction 42 are differentiated in the differentiator 46 connected to the junction. Differentiator 46 is similar to the differentiator 48 and includes a capacitor 86 and a diode 88 connected to ground. Operationally, the differentiator 46 generates a series of voltage spikes, as illustrated in FIG. 3c.

To complete the frequency converter 10, the voltage spikes from the differentiators 46 and 48 are integrated in the integrator 50. The integrator 50 includes diodes 90 and 92 having a common anode connection to a capacitor 94 connected to ground. The output of the integrator 50 is a voltage having a high ripple content with an average value displaced from zero by an amount related to the frequency of the signal connected to the input terminals 52 and 54. Higher frequency signals generate closer spaced voltage spikes which results in an average value with a greater displacement from the zero level. A very slowly varying signal at the input terminals 52 and 54 results in an average value for the wave at the output of the integrator 50 only slightly displaced from the zero voltage level. A typical wave at the output of the integrator 50 is illustrated at FIG. 3f.

While only one embodiment of the invention has been described herein and shown in the accompanying drawings, it will be evident that various further modifications are possible without departing from the scope of the invention.

What is claimed is:

1. A frequency converter in a system including a detector for generating a variable frequency signal, comprising:
   a. pulse-generating means responsive to said detector signal for producing a first train of pulses having a time displacement related to the frequency of said detector signal;
   b. inverter amplifier means connected to said pulse-generating means for producing a second train of pulses having a 180° phase shift with respect to said first series of pulses;
   c. first differentiator means connected to said pulse generating means for differentiating said first train of pulses and including a capacitor coupled between its input and output and a diode coupled between its output and a reference terminal; and
   d. second differentiator means connected to said inverter amplifier means for differentiating said second train of pulses and including a capacitor coupled between its input and output and a diode coupled between its output and a reference terminal; and
   e. integrator means connected to said first and second differentiator(s) means for integrating the differentiated first and second pulses into a combined DC signal having a magnitude related to and varying with the frequency of said detector signal.

2. A frequency converter in a system as set forth in claim 1 wherein said pulse-generating means includes:
   a. a first amplifier connected to receive the output signal of said detector for amplification thereof; and
   b. a second amplifier connected to said first amplifier and operating between an off condition and a saturated condition in response to the output of said first amplifier to produce said first train of pulses.

3. A frequency converter in a system as set forth in claim 2 wherein;
   a. said first and second differentiator means each include a capacitor connected to the output of said pulse-generating means and said inverter amplifier means, respectively; and
   b. a diode connected to each of said capacitors at the second terminal thereof.

4. A frequency converter in a system as set forth in claim 1 wherein said integrator means includes:
   a. a first diode connected to the junction of said capacitor and said diode of said first differentiator means; and
   b. a second diode connected to the junction of said capacitor and said diode of said second differentiator means, said integrator diodes having one terminal thereof connected to a common output junction.

5. A frequency converter in a system as set forth in claim 4 wherein said integrator means further includes a capacitor connected between said common output junction of said two diodes and a reference terminal.

6. A frequency converter in a system including a detector for generating a variable frequency signal, comprising:
   a. pulse-generating means responsive to said detector signal for producing a first train of pulses having a time displacement related to the frequency of said detector signal;
   b. inverter amplifier means connected to said pulse-generating means for producing a second train of pulses having a 180° phase shift with respect to said first series of pulses;
   c. first differentiator means connected to said pulse-generating means for differentiating said first train of pulses and including a capacitor connected to said pulse generating means and a diode connected to said capacitor at the second terminal thereof;
   d. second differentiator means connected to said inverter amplifier means for differentiating said second train of pulses and including a capacitor connected to said inverter amplifier means and a diode connected to said capacitor at the second terminal thereof; and
   e. integrator means connected to said first and second differentiator means for integrating the differentiated pulses into a combined signal having a magnitude related to and varying with the frequency of the said detector signal.

7. A frequency converter in a system including a detector generating a variable frequency signal, comprising:
   a. pulse-generating means responsive to said detector signal for producing a first series of pulses having a time displacement related to the frequency of said detector signal and a second series of pulses selectively phase shifted with respect to said first series of pulses;
   b. first and second differentiator means, each including a series-connected capacitor and a shunting diode and each coupled to said pulse generating means for respectively differentiating said first and second series of pulses; and
   c. signal-producing means coupled to said first and second differentiator means for producing a combined DC signal having a magnitude related to and varying with the frequency of said detector signal.

8. A frequency converter in a system as set forth in claim 7 wherein said signal-producing means includes integrator means having series-connected diodes and a shunting capacitor for integrating the differentiated first and second pulses and thereby producing said DC signal.